(12) United States Patent
Welles et al.

(10) Patent No.: US 9,580,630 B2
(45) Date of Patent: Feb. 28, 2017

(54) ADHESIVE COMPOUND

(71) Applicant: J. van Beugen Beheer B.V., Hellevoetsluis (NL)

(72) Inventors: Edwin Welles, San Antonio, TX (US); Leonard Van Beugen, Goudswaard (NL); Gerhard Maier, Munich (DE); Martin Mayershofer, Munich (DE)

(73) Assignee: J. VAN BEUGEN BEHEER B.V., Hellevoetsluis (NL)

( * ) Notice: Subject to any disclaimer, the term of this patent is extended or adjusted under 35 U.S.C. 154(b) by 0 days.

(21) Appl. No.: 14/823,035

(22) Filed: Aug. 11, 2015

(65) Prior Publication Data

US 2015/0344745 A1    Dec. 3, 2015

Related U.S. Application Data

(62) Division of application No. 13/141,085, filed as application No. PCT/EP2009/067832 on Dec. 23, 2009, now Pat. No. 9,133,372.

(60) Provisional application No. 61/144,748, filed on Jan. 15, 2009.

(30) Foreign Application Priority Data

Dec. 23, 2008    (EP) .................................. 08172868

(51) Int. Cl.
| | | |
|---|---|---|
| A61K 9/16 | (2006.01) | |
| C09J 123/12 | (2006.01) | |
| C09D 123/12 | (2006.01) | |
| C08K 3/26 | (2006.01) | |
| C08K 3/04 | (2006.01) | |
| C08K 3/22 | (2006.01) | |
| C09J 123/10 | (2006.01) | |

(52) U.S. Cl.
CPC .............. *C09J 123/12* (2013.01); *C08K 3/04* (2013.01); *C08K 3/22* (2013.01); *C08K 3/26* (2013.01); *C09D 123/12* (2013.01); *C09J 123/10* (2013.01); *C08K 2003/045* (2013.01); *C08K 2003/2227* (2013.01); *C08K 2003/265* (2013.01); *Y10T 428/26* (2015.01)

(58) Field of Classification Search
CPC ........ C09J 123/12; C09D 123/12; C08K 3/26; C08K 3/04; C08K 3/22; C08K 2003/2227; C08K 2003/265; C08K 2003/045
USPC ........................................................ 524/543
See application file for complete search history.

(56) References Cited

U.S. PATENT DOCUMENTS

| | | | |
|---|---|---|---|
| 2,551,087 A | 5/1951 | Barnhart | |
| 3,470,123 A | 9/1969 | Varron | |
| 3,850,670 A | 11/1974 | Gregory et al. | |
| 3,932,341 A | 1/1976 | Kutch | |
| 3,984,369 A | 10/1976 | Harlan, Jr. | |
| 4,138,378 A | 2/1979 | Doss | |
| 4,192,697 A | 3/1980 | Parker | |
| 4,558,875 A | 12/1985 | Yamaji | |
| 4,863,535 A | 9/1989 | More | |
| 4,946,529 A | 8/1990 | Huddleston | |
| 5,817,413 A | 10/1998 | Huddleston | |
| 5,898,044 A | 4/1999 | Nooren | |
| 6,033,776 A | 3/2000 | Huddleston | |
| 6,465,547 B1 | 10/2002 | Jackson | |
| 6,653,385 B2 | 11/2003 | Wang et al. | |
| 2007/0042193 A1* | 2/2007 | Wang ........................ B32B 7/12 428/423.1 |
| 2010/0015331 A1 | 1/2010 | Bieser | |

FOREIGN PATENT DOCUMENTS

| | | |
|---|---|---|
| CA | 2308802 A1 | 11/2001 |
| CN | 1571825 A | 1/2005 |
| EP | 0134491 | 3/1985 |
| EP | 0546635 A1 | 6/1993 |
| GB | 655375 A | 1/1948 |
| GB | 1014604 A | 12/1961 |
| GB | 1116879 A | 8/1965 |
| GB | 1188407 A | 6/1967 |
| GB | 1402424 | 8/1972 |
| GB | 1448391 | 9/1976 |
| GB | 1454845 | 11/1976 |
| GB | 1460828 | 1/1977 |
| GB | 1498129 | 1/1978 |
| GB | 2174708 A * | 11/1986 .............. C08L 23/10 |
| WO | 0052381 A1 | 3/2000 |
| WO | 2006091098 A2 | 8/2006 |
| WO | 2007022308 A | 2/2007 |
| WO | 2008056979 A2 | 5/2008 |

OTHER PUBLICATIONS

International Search Report WO 2010/072802 A3 published Aug. 19, 2010.

* cited by examiner

*Primary Examiner* — Hui Chin
(74) *Attorney, Agent, or Firm* — Hoyng Rokh Monegier LLP; Ramin Amirsehhi; David P. Owen

(57) ABSTRACT

An adhesive compound consisting essentially of an organic phase and inorganic phase, the organic phase comprising an amorphous aliphatic (co)polymer having a Ring & Ball softening point of between 75 and 180° C., and a second aliphatic material having a Tg of about −5° C. or lower and a kinematic viscosity of 4500 mm²/s at 100° C. or less, wherein said organic components are present in weight amounts of between 95/5 and 10/90; the inorganic phase comprising a filler, the filler being present in amount of at least about 15 wt % in the total composition. The compositions are suitable for anti-corrosion coatings or sealants against filtration or penetration of water or moisture. A rubber material may be added to this compound or other anti-corrosion coatings to increase the yield point at high temperatures.

20 Claims, No Drawings

ADHESIVE COMPOUND

CROSS REFERENCE TO RELATED APPLICATIONS

This application is a divisional of U.S. application Ser. No. 13/141,085 filed on 7 Sep. 2011, which is a continuation of PCT application number PCT/EP2009/067832 filed on 23 Dec. 2009, which claims priority from EP application number 08172868.5, filed on 23 Dec. 2008 and U.S. application No. 61/144,748, filed on 15 Jan. 2009. All three applications are hereby incorporated by reference in their entireties.

BACKGROUND OF THE INVENTION

1. Field of the Invention

The present invention relates to an adhesive compound, as for example a coating or paste. The compound can be in the form of a tape, like a repair tape, anti-corrosive coating tape or paste in the form of a bar. Dependent on the composition, the paste could also be used as putty and could be suitably handled by a caulking gun, similar to silicone sealants. More in particular, the present invention relates to the use of an adhesive compound as an anti-corrosive layer or sealant.

2. Description of the Related Art

A tape as anti-corrosive layer is for example described in U.S. Pat. No. 5,898,044. This tape comprises a fluid polyisobutene polymer with a glass transition temperature below −40° C. and one or more filler materials. Although this material has been useful for example for coating pipes and covers for manholes, it has still some disadvantages; in particular the behavior at elevated temperature is insufficient because this anti-corrosive coating exhibits a runny/dripping behavior at high temperature. This is a disadvantage because pipes for transport of deep well oil and gas near the well can be at a temperature of 70-85° C. Yet, at other places the coating tape needs to be effective at ambient temperature in the ground, but also at high and low (between 50° C. and −40° C.) temperatures at places where the oil pipes are above the ground surface or when the coating tape is used to coat man-hole covers.

Anti-corrosive coatings for pipes for transport of oil, gas or petrochemicals are demanding in view of its anti-corrosive properties, as corrosion due to humidity, as well as corrosion due to anaerobic bacteria has to be precluded.

Other applications may be less demanding, and the polyisobutene based coatings tend to be too expensive for a number of other applications.

WO2007/022308 describes a number of hot melt and foam-in-place gasket materials comprising a blend of rubber, semicrystalline olefinic polymer and other components. These compositions are described as having virtually no tack at room temperature.

BRIEF SUMMARY OF THE INVENTION

It is an object of the invention to provide an adhesive compound with improved high temperature characteristics.

It is a further object of the invention to provide an adhesive compound for use as an anticorrosive coating or paste with improved high temperature characteristics.

It is another object of this invention, to provide a coating or paste for use in building, construction, repair and the like as putty, sealant or the like as an alternative to polyisobutene coatings, showing a good tack to a variety of substrates and being highly impermeable to humidity/moisture and gas.

It is a further object of the invention to provide a coating or paste for use as waterproofing material and/or moisture and air and/or gas barrier.

DESCRIPTION OF ILLUSTRATIVE EMBODIMENTS

The following is a description of certain embodiments of the invention, given by way of example only. One or more of the aforementioned objects are achieved by providing an adhesive compound consisting essentially of an organic phase and inorganic phase, the organic phase comprises an amorphous aliphatic (co-)polymer or mixtures thereof having a Ring & Ball softening point of between 75 and 180° C. and a second aliphatic material having a Tg of about −5° C. or less and a kinematic viscosity of 120 $mm^2$/s at 100° C. or less, wherein said organic components are present in weight amounts of between 95/5 and 10/90 (polymer to second material); the inorganic phase comprising a filler, the filler being present in amount of at least about 15 wt % in the total composition.

The adhesive compound allows for very good adhesion, long term stability, self-healing characteristics, chemical resistance, and high impedance. The compound is therefore very suitable for use as coating, paste, or pressure sensitive adhesive. The compound has very low permeability for water or gas. Hence, the compound precludes water to form droplets on a metal surface, nor does it allow anaerobic bacteria to grow. The compound is therefore very suitable for use as coating or paste in anti-corrosive applications in the oil industry; repair tape in construction and the like.

It is thought, that because of the non-fluid character of the polymer, the temperature characteristics with respect to resistance to flow at about 80 or even 100° C. are substantially improved.

The word adhesive means that at 23° C., the product of the present invention is tacky to a substrate at least when the compound is pressed thereto. The compound can get an adhesion sufficient to have the material adhere to a surface and when adhered, the compound exhibits a cohesive failure.

A suitable test to determine tackiness, is—in analogy to EN 12068—as follows: a 25 cm long by 5 cm wide strip of material (1.4 to 2 mm thick) is pressed during 10 seconds to a clean steel plate with a 10 kg force per 1 $cm^2$, in such a way that no air is entrapped under the adhesive strip. Thereafter, the sample is stored for 24 hr at 23° C., and the compound is tested in a 90° peel test, for example with a tensile testing machine. The compound according to the present invention exhibits a cohesive failure, and part of the material stays adhered to the metal surface. Preferably, the compound is tacky at about 5 kg force per $cm^2$, and even more preferably at 2 kg force per $cm^2$.

Generally, the compound of the present invention has pressure sensitive adhesive characteristics if about 50 wt % or less second aliphatic material is present in the organic phase. The pressure sensitive character is a clear advantage over compositions with fluid polymers, as the compositions with fluid polymers are always tacky, also if not needed.

The compound is flexible at room temperature (23° C.). The compound generally has a Tg of about −10° C. or less, more preferably about −20° C. or less, and even more preferably about −30° C. or less.

The Tg can be measured in a rheometer (like for example Physica MCR 301), with a PP 8 (plate/plate geometry of 8 mm diameter, with 1 mm layer of material) and a heating rate of 2° C./min; with a 0.001% deformation and a frequency of 10 rad/s). The temperature at which G" shows a peak can be considered as the Tg. Generally, comparable results are obtained with a DSC or DMA. Some materials show more than one peak; generally, the Tg is the peak at the lowest temperature in the spectrum; a man skilled in the art knows which peak is considered the glass transition temperature.

An advantage of the compound of the present invention is its strength at high temperature. The compound, in particular if suitable as anti-corrosive coating, according to the present invention is non-fluid, and it appears to be possible to make compounds that keep their shape up to about 100° C. A parameter that is indicative for the high temperature flow behavior or strength is the yield point. A suitable way of measuring the yield point is in a plate-plate rheometer (as described above), in a measurement at elevated temperature (for example 90° C.), with a variable, increasing amplitude, and determining when G' equals G". Polyisobutene materials appear to show a yield point at deformation lower than 1% in a constant frequency sweep (10 rad/s) at 90° C. with increasing amplitude, whereas the compounds of the present invention generally exhibited a yield point at more than 1% deformation, preferably at about 2% or higher, and even more preferably at about 5% or higher, and even more preferably at about 10% or higher.

In an alternative way, rheological properties were determined on a TA Instruments AR, with a temperature unit and a plate/plate measuring system with a spindle of 4.1 cm (1.6 inch) diameter. The distance between the plates was in this case 4 mm. With such thicker layer of material the bulk properties seem to be measured in a more direct way. At 71° C., the polyisobutylene based materials did have a yield point below 0.01% deformation, whereas the materials of the present invention showed yield points above 1%. In a preferred embodiment, the materials of the present invention exhibit a yield point at 71° C. of about 0.1% deformation or higher, preferably at about 0.5% or higher, and most preferably at about 1% or higher, if measured in a rheometer with 4 mm plate distance and a 4.1 (1.6 inch) diameter spindle. Temperature sweeps were measured with a strain of 0.005% and an angular frequency of 6.3 Hz over a temperature range of 5 to 90° C. A material based on high molecular weight polyisobutylene and filler material exhibited at this very low strain level, at about 35° C. a G' equaling G". At a temperature above about 35° C., G' appeared to be lower than G", meaning that the material behaves as a fluid. In contrast, the materials according the present invention exhibit—at this stress level—always a G'>G"; meaning that this material behaves as a solid.

The compounds of the present invention exhibit besides the good high temperature characteristics also good tack and adhesive strength. The adhesive strength of the compound, because of the well balanced components, is such that a cohesive failure is observed.

The compound preferably is used in applications where limited tear force is applied on the layer of adhesive compound, such as in protective coatings, sealants for openings, crevices with low pressure applications, and ones that can be covered or wrapped with some sort of mechanical protection.

The amorphous aliphatic polymer generally is an ethene, propene or butene or higher alkene based polymer. The polymer can be a homo-polymer, co-polymer or mixtures of these. Copolymers include polymers from two, three or more monomers, and may be block-co-polymers and/or random copolymers.

Preferred polymers or copolymers are butene or propene-based and preferably comprise about 30 wt % or more propene or butene polymerized units.

Suitable butene based (co)polymers include polyethene-butene, polypropene-butene, polyethylene-isobutene, polyethene-propene-butene, polypropene-butene-hexene and the like.

In a particularly preferred embodiment, an amorphous propene based (co)polymer is used. Such amorphous propene based (co)polymer may be a-tactic polypropylene, co/terpolymers of propylene with other α-olefins having 2 to 10 carbon atoms, preferably 2 to 8 carbon atoms, including ethylene, 1-butene, 4-methyl-1-pentene, 1-hexene, 1-heptene, 1-octene and the like. Such copolymers are known in the art, and have rubbery characteristics at room temperature.

In a preferred embodiment, a PEPP copolymer is used; such PEPP copolymers may be random copolymers or block-copolymers, and preferably is a random copolymer. The amorphous propylene based polymer generally contains about 40 wt % of propene or more, and even more preferably about 60 wt % or more. Generally, the copolymers comprise about 90 wt % or more ethylene and propylene units, preferably about 95 wt % or more, and even more preferably about 98 wt % or more. Other monomer units preferably are C4 or higher ethylenically unsaturated compounds, like for example α,n-butene, isobutene, α,n-hexene, or α,n-octene. Such PEPP copolymers are known in the art, and commercially available.

In another preferred embodiment, an amorphous polypropylene is used, having about 10 mole % or less comonomers, preferably about 5 mole % or less, and the polypropylene may have substantially no other monomer copolymerized.

Suitable polymers include polymers with a melting point (measured as a R&B softening point) of about 75° C. or higher, preferably about 100° C. or higher, and even more preferable 110° C. or higher. The R&B softening point of the polymers generally will be about 180° C. or lower, preferably 160° C. or lower. The ring and ball softening point can be measured according to ASTM E28.

The Tg of the amorphous aliphatic polymer preferably is about −5° C. or lower, preferably −10° C. or more, and even more preferably about −20° C. or lower.

Generally, the polymers will have a Brookfield viscosity according to ASTM D3236 at 190° C. of about 20 cP or higher, preferably about 200 cP or higher. Preferably, the viscosity will be about 40,000 cP or lower, more preferably about 10,000 cP or lower.

Preferably, the average molecular weight (Mn in g/mol, as measured with high-temperature SEC calibrated with PE-standards; solvent trichlorobenzene; temperature 140° C.; refractive index detector) generally will be about 1,000 or higher, preferably about 2,000 or higher, and about 100,000 or lower, preferably about 50,000 or lower, and even more preferred about 30,000 or lower. A too low molecular weight may diminish the high temperature characteristics. A too high molecular weight may cause a lower tack. However, the molecular weight suitable in certain compositions will depend on the type and/or the amount of polymer, second aliphatic material and the optional other materials and may vary.

Preferably, the neat polymer exhibits a penetration depth of about 10.0 mm or less, preferably about 5.0 mm or less at 25° C. This hardness secures a sufficient strength of the composition of the present invention. The penetration depth is measured according to ASTM D5, which gives the depth in dmm, (tenth of a mm). The most common conditions are 100 g penetrating for 5 seconds at a temperature of 25° C. with a standard Needle of 50.8 mm length by 1 mm diameter. Generally, the penetration depth is about 0.1 mm or more, preferably about 0.3 mm or more, and even more preferably about 0.7 mm or more, as the polymer preferably is sufficiently soft to serve as a suitable base material for the adhesive compound.

The surface tension of such polymers is generally about 22-36 mN/m, preferably about 25 mN/m or more, and preferably about 33 mN/m or less (sessile drop technique using diiodomethane as probe liquid at 20° C.).

The term amorphous is used to describe the macroscopic behavior of the polymers; the polymer may show microcrystallinity. The polymer can be considered amorphous if the polymer, cooled from the melt without shear or stress applied, exhibits a degree of crystallinity of about 15% or less, preferably about 10% or less, and most preferably about 5% or less crystallinity, deduced from a DSC run at a heating rate of 10° C. per minute with reference values taken from the ATHAS database.

Suitable copolymers include Eastoflex® polymers from Eastman Chemical, such as for example Eastoflex® E1003, E1060 or E1200, Vestoplast® polymers from Evonik Degussa, such as for example Vestoplast® 408, 608, 703 or 750, or Rextac® polymers from Huntsman, such as for example Rextac® RT 2730, RT 3535, RT 3585, RT 4460. Suitable amorphous propylene polymers include Eastoflex® P1010 and P1023 or Rextac® RT 2115, RT 2180. and RT 3180, or Polytac R500 from Crowley Chemicals.

The second major component of the organic phase is an aliphatic material. Aliphatic in this invention comprises linear, branched and/or cycloaliphatic. It is preferred that the second aliphatic material is predominantly linear or branched as such material may have a lower Tg.

The second aliphatic material has a Tg of about −5° C. or less, preferably about −20° C. or less, and even more preferred about −30° C. or less. The Tg can be measured as described above.

This second aliphatic material generally is a fluid or semicrystalline waxy solid at room temperature. The second aliphatic material acts as a tackyfier Generally, the molecular weight of this material is about 3000 or less, preferably about 1500 g/mol or less, and more preferably 1000 g/mol or less, preferably 800 g/mol or less. Generally, the molecular weight will be about 100 g/mol or more, preferably about 200 g/mol or more. If the molecules are mainly linear, generally the molecular weight will be in the lower range. If branched, like oligomers of butene, the molecular weight can be higher. In case the second compound is a mixture of materials, the average molecular weight confers with the values described above, and the polydispersity of each single material is generally about 5 or less, and preferably about 3 or lower.

Generally, this material in substantially pure form is molten at 70° C., and will have a kinematic viscosity at 100° C. of about 4500 mm$^2$/s or lower, preferably about 3000 or lower, and more preferably about 700 mm$^2$/s or lower for oligomeric compounds, and of about 120 mm$^2$/s or lower, preferably of about 70 mm$^2$/s or lower for lower molecular weight compounds. The kinematic viscosity can be measured according to DIN 51562. Exemplary kinematic viscosities of Vaseline and of plasticizer oils at 100° C. are in the range of 10 to 15 mm$^2$/s or lower; tackifier resins may show a kinematic viscosity in the range of 30-70 mm$^2$/s. Oligomers, or low molecular weight polymers of butene may have kinematic viscosities up to 4500 mm$^2$/s or less, preferably about 3000 or less, and more preferably about 700 mm$^2$/s or less Generally, the second aliphatic material will exhibit a largely Newtonian fluid behaviour. Hence, such compound (in substantially pure form) will not comprise higher molecular weight compounds that would cause the fluid behaviour to become elastic.

In one preferred embodiment of the invention, the second aliphatic material is a polybutene oligomer or polymer. Polybutene is a viscous copolymer of butene and isobutene monomers. "Polybutene", as used herein, refers to both hydrogenated (CAS #68937-10-0) and unhydrogenated (CAS #9003-29-6) forms of the polymer. Polybutene is a viscous, colorless, non-drying, liquid polymer.

The second aliphatic compound is different from the amorphous polymer, thus the compound of the present invention contains at least two different materials in the organic phase. Generally, the amorphous polymer has a higher viscosity at 100° C. than the second aliphatic material. Furthermore, the second aliphatic material will generally exhibit a lower molecular weight than the polymer.

Preferably, the amorphous (co)polymer and the second aliphatic material both have about the same surface tension. This means that the surface tension is sufficiently similar that stable mixtures are obtained, and that no phase separation is observed or expected within a several years of use. More preferably, the amorphous polymer and second aliphatic material have such a surface tension that mixtures of these materials at the targeted mixture ratios do not show visible (by the naked eye) phase separation when kept for one month at 100° C.

Preferably, the second aliphatic material has a surface tension of about 22-36 mN/m, and more preferably about 25 mN/m or higher, and preferably about 33 mN/m or lower.

Preferably, the difference between the surface tension of the polymer and the aliphatic compound is about 7 mN/m or less, more preferably, 5 mN/m or less, and even more preferably 3 mN/m or less.

In one preferred embodiment (in particular for use as anti-corrosive coating in the oil and gas industry), the second aliphatic material is substantially purely aliphatic or cycloaliphatic. Preferably, the amount of olefinic and/or aromatic groups is low; the amount of olefinic and/or aromatic groups preferably is about 3 mol % or lower, preferably about 2 mol % or lower. Furthermore, the material preferably does not contain oxygen or nitrogen heteroatoms, hence, the amount of these heteroatoms will be about 2 mol % or lower.

In another preferred embodiment of the invention (in particular for less demanding long term uses), the second aliphatic material may comprise higher amounts of olefinic unsaturation and/or aromatic groups. The amount preferably is about 20 mol % or less, preferably about 15 mol % or less. Such relatively high amounts can be acceptable when the amount of olefinic unsaturation in the ultimate composition is about 3 mol % or less, preferably about 2 mol % or less.

Suitable second aliphatic materials include wax, purified oil fractions, synthetic oils, paraffinic white oils, white petrolatum and the like. Further suitable materials include low molecular weight polyisobutene, polybutene and low molecular weight resins made by copolymerizing and hydrogenating lower (C4-C8) diolefins with lower (C4-C8) monoolefins or polymerizing and hydrogenating cyclodiolefins, and the like. Suitable examples include Penreco® Snow, Penreco® Super, Penreco® Ultima, Penreco® Regent, oil HB 40, Primol® 352, 382, 542 from Exxon, Ondina® 15, 32, 46, 68 from Shell, Wingtack® 10 from Cray Valley, Piccotac® 1020-E, Regalrez® 1018, Regalite® 1010 from Eastman Chemical, Escorez® 2520 from Exxon Mobil.

Suitable polybutenes for use herein include, but are not limited to: Indopol L-14, Molecular Weight ("MW")=370; Indopol L-50, MW=455; Indopol L-65, MW=435; Indopol L-100, MW=510, H-15, MW=600; H-25, MW=670; H-35, MW=725; H-40, MW=750; H-50, MW=815; H-100, MW=940; H-300, MW=1330; H-1500, MW=2145; H-1900, MW=2270; Panalane L-14E, MW=370; Panalane H-300E, MW=1330; all trade names of BP Amoco Chemicals (Chicago, Ill.). Other suitable grades of polybutene include Parapol 450, MW=420; Parapol 700, MW=700; Parapol 950, MW=950; Parapol 1300, MW=1300; and Parapol 2500, MW=2700; all trade names of ExxonMobil Corporation.

The organic phase may further comprise one or more antioxidants, coloring agents, other polymers or oligomers, bitumen, clarifying/nucleating/antistatic agents, flame retardants, acid scavengers, compatibilizers, other plasticizers and the like.

Suitable antioxidants include phenolic antioxidants, phosphites, lactones, thioesters, hydoxylamines, hindered amine light stabilizers (HALS) and other stabilizers.

The amount of the one or more anti-oxidant (relative to the organic phase) may vary, and can be about 4 wt % or less, and is preferably about 2 wt % or less. Suitable amounts may be 0.05 wt % or more, and more preferably between 0.1-1.8 wt %.

In one embodiment, the composition comprises at least one primary antioxidant. A preferred primary antioxidant comprises sterically hindered phenol groups. Suitable sterically hindered phenol compounds are selected from the group consisting of for example Irganox® 1076, Irganox® 1098, Irganox® 1035, Irganox® 1330, Irganox® 1010, Irganox® 3114, Irganox® 245, Irganox® MD 1024, Irganox® 259, Irganox® 3125 and the like. Instead of or in addition to the sterically hindered phenols, sterically hindered alkylthiomethylphenols or arylthiomethylphenols such as Irganox® 1520 or Irganox® 1726 may be used.

In another preferred embodiment, the composition comprises a mixture of primary and secondary antioxidants.

Suitable secondary antioxidants include phosphites and thioesters. According to the invention, suitable phosphites are Irgafos® P-EPQ, Irgafos® 12, Irgafos® 168, Irgafos® 38, Irgafos® 126 and the like. Suitable thioesters may be selected from compounds such as Irganox® PS 800, Irganox® PS 802 and the like.

In another preferred embodiment, the composition comprises a mixture of phenolic-type primary antioxidants phosphite-type secondary antioxidants and lactone-based antioxidants. Such mixtures are known in the art, and commercially available, e. g., as Irganox® HP or Irganox® XP blends from Ciba.

In another preferred embodiment, in addition to primary and/or secondary anti-oxidants, sterically hindered amines may be included in the composition. Suitable sterically hindered amines may be selected from compounds such as Chemassorb® 2020, Chemassorb® 944, Chemassorb® 119 and the like.

In yet another preferred embodiment, no antioxidants are added or used. This may be preferred for costs reasons, and may be possible when mixing of the components is performed at reasonable low temperature.

Suitable coloring agents include dyes that are soluble in the organic phase such as for example phthalocyanine pigments. Such dyes may be present in a suitable amount to impart sufficient color. Preferably, the amount is about 0.2 to 4 wt % with respect to the organic phase.

The organic phase may further comprise polymeric or oligomeric compounds like tackifiers, rubbers, polyolefins (other than the first polymer) and the like. This further material is different from the amorphous polymer and from the second aliphatic material. This further material may be used to improve tack, improve yield strength, lower the Tg and the like.

In one preferred embodiment, the amount of unsaturation in these polymers or oligomers is about 4 mol % or lower as too high amounts of olefinic unsaturation may cause a decrease in stability. Further, the polymers or oligomers preferably do not comprise substantial amounts of aromatic groups, like about 4 mol % or less.

In another preferred embodiment, the amount of olefinic unsaturation and/or aromatic groups is higher. The suitability depends much on the end-use, and compounds like SBS rubber may be useful, depending on such end-use. Suitable amounts of olefinic unsaturation and/or aromatic groups may be about 8 mol % of the total organic phase or less, preferably about 5 mol % or less, and even more preferred about 2 mol % or less.

The polymeric or oligomeric compound is a different compound than the amorphous aliphatic (co)polymers in the adhesive compound. In one preferred embodiment, the polymeric compound has a higher molecular weight than the polymer used as amorphous (co)polymer. In another preferred embodiment, the polymeric or oligomeric compound is used to increase the tackiness of the compound and it has a lower molecular weight than the amorphous (co)polymer.

The polymeric and/or oligomeric compounds are distinguished from the second aliphatic material by their higher viscosity and/or softening points (measured as R&B softening point).

Suitable polymers and oligomers include natural rubber, butyl rubber as well as bromobutyl and chlorobutyl rubber, SBS, SEBS, SIS rubbers (e.g, Kraton® or Vector grades), polyisobutylene polymers (e.g. Opanol® of BASF or Indopol® polymers of INEOS), fully hydrogenated aliphatic and/or cycloaliphatic hydrocarbon resins (e.g. Escorez® 1304, Escorez® 5380 or Regalite® R1090), Keltan® EPDM or EPM rubbers, or Vistalon® polymers from Exxon Chemicals, such as for example Vistalon® 404 or 805 and the like.

The Mooney viscosities of non crosslinked rubbers (ML 1+8, 125° C.) suitable for the compositions may vary, and can be about 100 or less, and are preferably about 80 or less. Suitable Mooney viscosities (ML 1+8, 125° C.) may be 10 or more, and more preferably between 20 and 70.

In another embodiment, a suitable rubber is Kalene® 800 or 1300 from Royal elastomers (which are poly(isobutylene-isoprene) polymers with a Tg of about −70° C.).

R&B softening points of tackifying hydrocarbon resins suitable for the compositions may vary, and can be about 150° C. or less, and is preferably about 120° C. or less. Suitable R&B softening points may be 60° C. or more, and more preferably between 80° C. and 115° C.

The amount of this polymeric or oligomeric compound—if present—preferably is present in an amount of about 1 wt % or more, preferably about 2 wt % or more relative to the organic phase. Generally, the amount will be about 40 wt % or less with respect to the organic phase, preferably about 30 wt % or less and even more preferred about 25 wt % or less. The amount can be in a range consisting of any combination of the values stated. Suitable amounts have been shown to be e.g. 5 wt %, 9 wt % and 14 wt %.

Generally, the incorporation of so-called crystallinic polyolefins is less desirable, as they tend to decrease the tack. Such (actually semi-) crystallinic polymers can be polyethylene, isotactic polypropylene and the like. Hence, preferable, the amount of such semi-crystalline polymers is less than 5 wt %, preferably less than 3 wt % relative to the total composition, and such polymers are most preferably not present.

It has furthermore been discovered that the strength characteristics of the compositions of the present invention at elevated temperature, as well of those based on liquid polyolefin polymers can be improved with the use of limited amounts of rubber polymers or other amorphous polymers with a molecular weight of about 30,000 or more. The molecular weight preferably is about 50,000 or more, and even more preferably about 100,000 or more. Rubber polymers include EPDM rubber, polyisoprene, polyisoprene-polyisobutene copolymers, natural rubber, butyl rubber as well as bromobutyl and chlorobutyl rubber, SBS, SEBS, SIS rubbers (e.g, Kraton® or Vector© grades), and the like. It appeared that olefinic unsaturation in the rubbers did not substantially reduce the long term stability, as the unsaturation is sufficiently isolated that little adverse effects were seen. Suitable rubbers include Chlorobutyl 1066 rubber (Exxon Mobil, which is a chlorinated isobutene/isoprene rubber), Keltan® EPM or EPDM rubber and the like. Also a limited amount of polyisobutene with high molecular weight is suitable to increase the yield point and thereby the high temperature characteristics.

The rubber component is distinguished from the aliphatic polymer by the higher molecular weight, while having a low glass transition temperature. Without wanting to be limited to this theory, it is thought that because of the high molecular weight of the rubber or further compound, the polymer chains cause substantial entanglements, and thereby cause a yield point at higher deformation.

The rubber component can be used as non-vulcanized polymer or as slightly crosslinked polymer. The rubber polymer preferably is homogeneously mixed with the amorphous (co)polymer and the second aliphatic compound, which would be difficult when the rubber would be highly crosslinked during mixing.

The Mooney viscosities of non crosslinked rubbers (ML 1+8, 125° C.) suitable for the compositions may vary, and can be about 100 or less, and are preferably about 80 or less. Suitable Mooney viscosities (ML 1+8, 125° C.) may be 10 or more, and more preferably between 20 and 70.

The amount of rubber material generally in the organic phase is about 1 wt % or more, preferably about 2 wt % and even more preferably about 3 wt % or more. Generally, the amount is about 30 wt % or less, preferably about 25 wt % or less, and even more preferred about 15 wt % or less.

With the use of rubber polymers the yield strength is increased, and the flowability of the composition at elevated temperature is reduced. With such reduction, the useful temperature of the coating is substantially increased up to 85° C. or higher, like for example to about 90° C.

Thus, the present invention also relates to the use of a rubber or aliphatic polymer material with a molecular weight of about 30,000 or higher in an amount relative to the organic phase, of about 1 wt % or more, preferably about 2 wt % or more, and an amount of about 30 wt % or less, preferably about 25 wt % or less, to increase the yield strength of an anti-corrosive coating containing about 20-70 wt % fluid polyisobutene polymer and about 30-80 wt % inorganic filler. The preferred embodiments as described before are particularly suitable in this embodiment as well.

In another preferred embodiment, the amount of this oligomeric or polymeric (in particular rubber) compound is less than 5 wt % relative to the total composition, preferably less than 3 wt %, and is in this embodiment most preferably not present. A substantial amount of rubber tends to decrease the tack, which may be less preferable, depending on the application.

The anti-corrosive coating according this invention contains about 20-70 wt % fluid polyisobutene polymer and about 30-80 wt % inorganic filler and a further rubber or aliphatic polymer material with a molecular weight of about 30,000 or higher in an amount relative to the organic phase, of about 1 wt % or more, preferably about 2 wt % or more, and an amount of about 30 wt % or less, preferably about 25 wt % or less. The rubber or aliphatic material aids to increase the yield strength.

The inorganic phase comprises inorganic filler material as major component. The filler material influences the rheological behavior.

Suitable filler materials are inorganic minerals, salts, oxides and carbon black. Suitable examples include calcium carbonate, silicon oxide, alumina oxide (which may be in the form of an alumina trihydrate), titanium dioxide, boron sulphate and (ground) quartz, sand, talc, slate, and bentonite. A preferred filler material is calcium carbonate.

Suitable filler materials will have an average particle size of about 50 μm or lower, preferably of 10 μm or lower, and even more preferred about 5 μm or lower. Generally, the average particle size will be about 0.1 μm or more, preferably, about 0.4 μm or more.

The particle size can be measured with laser scattering.

Suitable filler materials may have one particle size and a homogeneous particle size distribution, or may have two or more particle sizes and two or more particle size distributions. Very suitable products may have a particle size distribution such that all particles have a size of about 50 μm or less, more preferably about 10 μm or less, and such that at least 60% of the particles has a size of 0.1 μm or more, preferably, at least about 60 wt % has a size of 0.4 μm or more. In a particular preferred embodiment, at least about 80 wt % of the particles has a size of about 0.6 μm or more.

The filler material preferably is treated to enhance its ability to stably mix with a-polar materials. Generally, filler materials are made more hydrophobic by surface treatment, for example with fatty acids, fatty alcohols and the like.

Suitable filler materials have a low solubility in water or preferably about 0.05 g/l or less.

The amount of filler in the inorganic phase generally will be about 80 wt % or more, preferably about 90 wt % or more, and even more preferably about 95 wt % or more.

Suitable filler materials include, but are not limited to Omyalite® 95T, Omyacarb® FT-FL, Omyalite® 90T, Hydrocarb® 95T, Hydrocarb® OG, several Microdol® and Finntalc® grades, Micaflor® MF8, Micaflor® MF10, Micaflor® MF25, Mistron® talc, or Talkron® PR-10.

Other materials in the inorganic phase can be colorants, brightener and the like. Many pigments are inorganic crystalline or amorphous materials. It is preferred that the coating comprises a minor amount of colorant, such as for example about 5 wt % or less, more preferably about 3 wt % or less and maybe even about 1 or 0.5 wt % or less relative to the inorganic phase. The pigment may be surface treated or thoroughly dispersed in an appropriate liquid to enhance its ability to stably mix with aliphatic materials. Suitable colors include yellow (e.g, goethite, zinc ferrite), green (e.g, chrome(III)oxide), brown or black (e.g., magnetite, manganese ferrite), and red (e.g., hematite) or suitable mixtures thereof and additional materials, such as optical brighteners (e. g. titanium dioxide) and the like.

The main components (amorphous (co)polymer, second aliphatic compound and inorganic filler) of the adhesive compound preferably make up about 70 wt % of the compound, preferably about 80 wt % or more, and most preferably about 90 wt % or more.

Depending on the required rheological behavior, amounts of the components can be adjusted.

The relative weight amount of organic to inorganic phase generally will be between about 10/90 to 85/15. Preferably, about 20 wt % or more organic phase will be present, preferably about 25 wt % or more. Preferably, the amount of the organic phase will be about 70 wt % or less, preferably about 60 wt % or less. Hence, preferably, the amount of inorganic phase is about 30 wt % or more, more preferably about 40 wt % or more. Sufficient amount of inorganic material aids in achieving good rheological behavior and stability.

The amount of amorphous aliphatic (co)polymer to second aliphatic material may vary in certain limits depending on the required characteristic of the ultimate product and is generally within the range of 95/5 to 10/90. For example, a stable well performing anti-corrosive coating was obtained with a 70/30 mixture of PEPP copolymer and Vaseline. In a 30/70 mixture of these components, a paste type of material was obtained with good fluid and sticky properties. Hence, the amount of polymer relative to the amount of second aliphatic component preferably is about 10 wt % or more, preferably about 20 wt % or more. The amount of polymer generally is about 95 wt % or less, preferably about 90 wt % or less and even more preferred about 80 wt % or less.

In one embodiment of the invention, the organic phase comprises an amount of amorphous (co)polymer of between about 50-85 wt % and an amount of second aliphatic material of between about 13-40 wt %. The composition preferably comprises an amount of antioxidant of about 0.1 wt % or more. In this embodiment the amount of organic phase is about 25 to 65, preferably about 25-55 wt % and the amount of inorganic phase is about 35-75, preferably about 45-75 wt %. This composition is very suitable for use as anti-corrosive coating, sealant or repair material. The amount of amorphous (co)polymer preferably is about 15 wt % to 45 wt % with respect to the total composition.

The anticorrosive or repair coating preferably is used as a layer on a plastic polymer backing. The backing may be continuous plastic sheet, non-woven or woven material. Suitable materials for the backing include polyolefin like PP or PE, polyester or polyamide, rubber like EPDM, Kevlar©, PVC, cross-linked thermoplastic polyethylene and UV curing polyester. In one embodiment, the plastic backing preferably is polyolefin sheet of material like polyethylene or polypropylene. In another embodiment, the backing layer may be polyester (for example PET), polyamide (for example nylon-6,6) or the like. Polyester sheet is preferred as backing, as it allows for good printability, is resilient and has good UV resistance.

In a preferred embodiment, the anticorrosive or repair coating is in the form of a tape with a polymer sheet as backing, a layer of anti-corrosive coating of between 0.1 and 4 mm thick, preferably 0.3-2 mm thick, and a non-adhesive removable release liner (like for example a silicon-impregnated film). On application, the release liner is removed and the coating tape is applied with its adhesive coating side to the object to be coated, and the plastic backing at the outside. Preferably, the tape is about 5 cm (2 inch) or more wide, more preferably about 7.5 cm (3 inch) wide or more. Generally, the tape is about 50 cm (20 inch) wide or less, preferably about 25 cm (10 inch) or less.

The tapes of the current invention furthermore, preferably, comprise a reinforcing mesh. Such mesh may be woven or non-woven, and suitable materials include fiber-glass, polyester, nylon, Dyneema®, Twaron® Kevlar®, PP, PE and PVC.

The anti-corrosive or repair coating preferably is produced in the form of a wrap tape in roll form or as a patch and hence used as a layer on a release liner, preventing the wraps to stick to each other or the patch to stick to a packing material or itself when fold up. The lamination to the release liner happens in the initial stage of the production process by means of extrusion or calendaring. The release liner has such characteristics that it can easily be removed from the wrap tape upon application to a substrate. Suitable release liners are produced from silicones, Teflon® or other easy removable polyolefin materials. In a second stage during the same production process, a meshed carrier and a sheet are subsequently applied to the upper part of the wrap tape or patch, in such way that the meshed carrier will be embodied in the wrap tape or patch and the plastic top layer is used as a protective outer layer. Special rollers will enhance the impregnation of the meshed carrier into the tape or patch.

In another preferred embodiment of the invention, the organic phase comprises an amount of amorphous copolymer of between about 20-50 wt %, the amount of second aliphatic material is between about 77-40 wt %. In this embodiment the amount of organic phase is about 35-75 wt % and the amount of inorganic phase is 25-65 wt %. This composition is very suitable for use as paste with excellent tackifying characteristics, combined with anti-corrosive and stability characteristics. Hence, it is very suitable as putty, sealant or the like.

The adhesive compound of the present invention can be made by mixing the several components in a kneader, mixer, extruder or the like. In one embodiment of the invention, it is preferred to mix the components in a kneader under reduced pressure to preclude air entrapment in the composition. However, it is also possible to knead at atmospheric pressure. Kneading will cause the temperature to rise.

Preferably the components are mixed at room temperature, and kneaded, where the temperature generally reaches about 50° C. or higher, more preferably about 70° C. or higher. It is preferred to perform the kneading at a temperature of about 170° C. or lower, preferably about 140° C. or lower, and most preferably about 130° C. or lower. Mixing at higher temperatures like at about 180° C. is possible, but may require more anti-oxidants to keep stability.

The compositions can be suitably used for coating steel pipes, man-hole covers and the like. The coating compositions can also be used for encapsulating objects containing hazardous components such as objects with lead containing coatings, asbestos and the like. Such objects can be successfully encapsulated with the coating according to the present invention, as the high impermeability to water and gasses of the coating will prevent the hazardous materials to spread into the environment, and thereby making these effectively harmless. Furthermore, the easy application allows for minimal surface preparation and therefore minimal environmental exposure of the hazardous materials during application.

Other useful applications are the repair of leaks in roofs, pipes for air-conditioning, sewer pipes and the like. The paste can be used to fill cracks, fix windows and the like but also to encapsulate electrical wiring. For example, the compound can be used for the sealing of cable and pipe conduits, cracks and holes to prevent penetration of water The invention will be elucidated with the following non-limiting examples.

Example 1

In a kneader, an organic phase consisting of PEPP (Eastoflex® E1060), part of the Vaseline and Omyalite® 95T was added (40 wt % organic phase, 60 wt % filler) and the materials were mixed (ultimately polymer/Vaseline ratio was 70/30). When homogeneous to the eye the remainder of the Vaseline was added, and the materials were mixed for a total time of about 2 hr with a highest temperature of about 70° C. A homogeneous adhesive compound was obtained. The material was cooled, and the finished compound was extruded continuously in four strings of beads, placed on a 5 cm wide siliconized film. A polyester cloth was applied on the beads with the same width as the siliconized film and pressed with a heavy roller or calendaring unit to create sufficient bonding with the compound.

A piece of 5×10 cm was cut from the strip, and the rheological behavior was studied (no pressure applied). The material did not show cold flow, nor flow at 50 or 100° C. In contrast, a PIB based material exhibited flow, in particular above 60° C.

The strip was used to coat 20 cm of a rusty steel pipe, and the adhesive compound was firmly pressed with hand pressure to the pipe. After one day, the polyester outer layer was peeled off; the adhesive showed cohesive failure, meaning that the adhesive kept covering the pipe.

Example 2 and Comparative Experiment A

Another batch of material was made according to example 1. This material was compared with a PIB based material with 60 wt % filler and 40 wt % Oppanol B 10 SFN from BASF. A cone penetration test was performed according to ASTM D217. Results are given in Table 1.

TABLE 1

| Temperature | Example 2 PP-based | | Comparative experiment PIB-based | |
|---|---|---|---|---|
| | D217 test | Difference | D217 test | difference |
| 23° C. | 66 | | 58 | |
| 50° C. | 95 | +44% | 99 | +71% |
| 78° C. | 133 | +40% (cumulative 102%) | 149 | +51% (cumulative 157%) |

These tests show that the strength of PP based material is substantially less sensitive to a temperature increase than polyisobutene based coatings.

Example 3

A paste like material was made in an analogous way as the compound of example 1, but the amounts were: 70/30 Vaseline/Eastoflex® E1060; and 50/50 organic/inorganic phase. The inorganic material was Omyalite® 95T. The paste could be used as putty; and could be suitably handled by a caulking gun, similar to silicone sealants.

Examples 4-6

Three formulations were prepared by thoroughly mixing the components as stated in Table 2.

The compounds of Examples 4 and 5 were prepared in a tilting sigma blade mixer; all components but Piccotac® 1020-E were mixed at 170 to 180° C. at about 400 mbar for about 3 hr. Piccotac® was added, and the mixture was kneaded for another 1.5 hr. A homogeneous adhesive compound was obtained.

The compound of Example 6 was obtained by mixing all components but the Omyalite® at 70-120° C. at about 400 to 500 mbar. When homogeneous to the eye, Omyalite® was added, and the mixture was kneaded for another two hr in a temperature range of about 50 to 110° C. at about 400 mbar. A homogeneous adhesive compound was obtained.

Rheological properties were determined on a Physica MCR 301, with a CTD 600 temperature unit and a PP 8 measuring system (plate/plate with 8 mm diameter, and a 1 mm distance between the plates).

Temperature sweeps were done from −70° C. to 90° C. at a deformation of 0.001 (which slightly increased up to 0.01%), with a constant frequency of 10 rad/s, while heating with 2° C./min. Furthermore, amplitude sweeps were done at 90° C. with increasing deformation from 0.001% to 10% at a constant frequency of 10 rad/s. All three samples showed strong adhesion and cohesive failure of the compound in a 90° peel test. Further results are summarized in Table 2.

TABLE 2

| | | Example | | |
|---|---|---|---|---|
| | | 4 | 5 | 6 |
| Composition Raw material | Supplier | Amount in wt % | Amount in wt % | Amount in wt % |
| Eastoflex ® E1003 | Eastman Chemical | 33.5 | 28.5 | — |
| Eastoflex ® E 1060 | Eastman Chemical | — | — | 34.0 |
| Piccotac ® 1020-E | Eastman Chemical | 7.3 | 7.3 | — |
| Vaseline | Fauth & Co | — | — | 11.3 |
| Chlorobutyl rubber 1066 | Exxon Mobil | 8.3 | 4.0 | — |
| Irganox ® 1010 | Ciba | 0.9 | 0.8 | 0.4 |
| Irgafos ® 168 | Ciba | 0.5 | 0.4 | 0.1 |
| Omyalite ® 95T | Omya | 49.5 | 59.0 | 54.1 |
| Rheological properties | Measurement | | | |
| Tg | Temperature sweep | −36° C. | −33° C. | −33° C. |
| Yield point | Amplitude sweep at 90° C.; at % deformation | >10% Estimated 20-30% | >10% Estimated 15% | 2.5% |

Example 7

In an analogous way to example 1, a compound was prepared from 59.6 wt % $CaCO_3$ (Omyalite), 29.1 wt % polypropylene (polytac R-500), 11.2 wt % polybutene (Indopol H-300) and 0.1 wt % coloring material. The yield point at 71° C.—measured with an AT instruments as described above, using a gap of 4 mm—was higher than 1%; the high temperature characteristics of this compound were excellent. The tack at room temperature was good, the compound showed cohesive failure.

Example 8

In an analogous way to example 1, a compound was prepared from 60.0 wt % $CaCO_3$ (Omyalite), 25.9 wt % polypropylene (polytac R-500), 14.0 wt % polybutene (Indopol H-300) and 0.1 wt % coloring material. The yield point at 71° C.—measured with an AT instruments as described above, using a gap of 4 mm—was higher than 1%; the high temperature characteristics of this compound were good, and the low temperature properties were improved with respect to the material of example 7. The tack at room temperature was very good, the compound showed cohesive failure.

Examples 9 and 10

In an analogous way to example 7, compounds were prepared with $Al(OH)_3.5H_2O$ as a filler, and with a mixture of Omyalite and carbon black. Both compounds showed good properties. The compound with $Al(OH)_3.5H_2O$ exhibited a better gloss, and flame retardant properties.

What is claimed is:

1. A process for coating a steel pipe or a man hole cover, comprising:
   preparing a compound consisting essentially of an organic phase and inorganic phase, the organic phase comprising an amorphous aliphatic propene based polymer or copolymer with 30 wt % or more polymerized propene units and having a Ring & Ball softening point of between 75 and 180° C., and a second aliphatic material having a Tg of about −5° C. or lower and a kinematic viscosity of 4500 $mm^2$/s at 100° C. or less, wherein said organic components are present in weight amounts of between about 90/10 and about 20/80, said polymer or copolymer relative to said second material; the inorganic phase comprising a filler, the filler being present in an amount of at least about 30 wt % in the total composition, by mixing components of the compound at a temperature of about 50° C. or higher,
   cooling the prepared compound to form a solid compound,
   applying the solid compound on a steel pipe or a man hole cover.

2. The process according to claim 1, wherein the step of applying the solid compound comprises applying the compound as anti-corrosive coating in the oil and gas industry, repair tape in construction, as an anti-corrosive or repair coating or sealant for steel pipes or for man hole covers.

3. The process according to claim 1, wherein the amorphous aliphatic propene based polymer or copolymer is a polyethene-polypropene random copolymer or an amorphous polypropene polymer.

4. The process according to claim 1, wherein the amorphous aliphatic polymer or copolymer is present in about 15 wt % to 45 wt % with respect to the total composition.

5. The process according to claim 1, wherein the amorphous aliphatic polymer or copolymer has one or more of the following characteristics: (i) the Tg of the amorphous aliphatic polymer or copolymer is about −10° C. or lower, (ii) the polymer or copolymer has a Brookfield viscosity at 190° C. of about 20 cP or higher, the viscosity being about 40,000 cP or lower, (iii) the average molecular weight, Mn, as measured with SEC against polyethene standard, is about 1,000 or higher, and about 100,000 or lower, (iv) the neat polymer or copolymer exhibits a penetration depth of about 10.0 mm or less at 25° C.

6. The process according to claim 1, wherein the second aliphatic material has a molecular weight of about 1500 or lower, and a molecular weight of about 100 or more and wherein the second aliphatic material is a fluid at room temperature, and has a kinematic viscosity of about 3000 $mm^2$/s or less.

7. The process according to claim 1, wherein the organic phase of the composition further comprises polymeric or oligomeric compounds, different from the amorphous aliphatic polymer or copolymer and the second aliphatic compound, in an amount of about 2 wt % or more, and an amount of about 30 wt % or less.

8. The process according to claim 1, wherein the filler material is at least one inorganic mineral, salt or oxide, wherein the filler material has an average particle size of about 50 μm or lower, and of about 0.1 μm or higher.

9. The process according to claim 8, wherein the filler material is at least one inorganic mineral, salt or oxide, wherein the filler material has an average particle size of about 10 μm or lower.

10. The process according to claim 1, wherein the amorphous aliphatic polymer or copolymer, second aliphatic compound and inorganic filler constitute about 80 wt % or more of the total composition.

11. The process according to claim 1, wherein the amount of amorphous aliphatic polymer or copolymer in the organic phase is about 85% or less.

12. The process according to claim 1, wherein the compound exhibits a yield point at 90° C. at deformations of more than 1% when measured at 10 rad/sec with increased deformation.

13. The process according to claim 1, wherein the compound exhibits a cohesive failure when adhered to a surface, when tested: (i) a 25 cm long by 5 cm wide strip of the solid compound, 1.4 to 2 mm thick, is pressed during 10 seconds to a steel plate with a 5 kg force per 1 $cm^2$, in such a way that no air is entrapped under the strip; (ii) thereafter, the sample is stored for 24 hr at 23° C., and (iii) the compound is tested in a 90° peel test.

14. A process for coating a steel pipe, or a man hole cover, comprising:
   preparing a compound consisting essentially of an organic phase and inorganic phase, the organic phase comprising an amorphous aliphatic propene based polymer or copolymer with 30 wt % or more polymerized propene units and having a Ring & Ball softening point of between 75 and 180° C., and a second aliphatic material having a Tg of about −5° C. or lower and a kinematic viscosity of 4500 $mm^2$/s at 100° C. or less, wherein said organic components are present in weight amounts of between about 90/10 and about 20/80, said polymer or copolymer relative to said second material; the inorganic phase comprising a filler, the filler being present in an amount of at least about 30 wt % in the total composition, by mixing components of the compound at a temperature of about 50° C. or higher,
   cooling the prepared compound,
   applying the cooled compound on a plastic backing and coating the steel pipe or man hole covers with the compound having a plastic backing.

15. The process according to claim 14, wherein the amorphous aliphatic polymer or copolymer, second aliphatic compound and inorganic filler constitute about 80 wt % or more of the total composition.

16. The process according to claim 15, wherein the compound exhibits a yield point at 90° C. at deformations of more than 1%, when measured at 10 rad/sec with increased deformation.

17. The process according to claim 16, wherein the compound exhibits a cohesive failure when adhered to a surface, when tested: (i) a 25 cm long by 5 cm wide strip of the compound, 1.4 to 2 mm thick, is pressed during 10 seconds to a steel plate with a 5 kg force per 1 $cm^2$, in such a way that no air is entrapped under the strip; (ii) thereafter, the sample is stored for 24 hr at 23° C., and (iii) the compound is tested in a 90° peel test.

18. The process according to claim 17, wherein the filler material is at least one inorganic mineral, salt or oxide, wherein the filler material has an average particle size of about 10 μm or lower.

19. The process according to claim 14, wherein the compound is applied as a layer on a plastic backing in the form of a tape; the plastic backing being polyolefin, polyester or polyamide sheet of material, wherein the compound is between 0.1 and 4 mm thick.

20. The process of claim 1, wherein the amorphous aliphatic propene based polymer or copolymer has a degree of crystallinity of less than 5%.

\* \* \* \* \*